Sept. 5, 1944.  E. G. BAILEY ET AL  2,357,301
FUEL BURNING METHOD AND APPARATUS
Filed March 7, 1941  8 Sheets-Sheet 1

Ervin G. Bailey,
Howard J. Kerr,
James Fletcher,
George A. Watts, and
Lambert Kooistra
INVENTORS
BY
ATTORNEY.

Sept. 5, 1944.   E. G. BAILEY ET AL   2,357,301
FUEL BURNING METHOD AND APPARATUS
Filed March 7, 1941   8 Sheets-Sheet 2

INVENTORS
Ervin G. Bailey, Howard J. Kerr,
James Fletcher, George A. Watts
and Lambert Kooistra
BY
Joseph P. Moran
ATTORNEY.

Sept. 5, 1944.  E. G. BAILEY ET AL  2,357,301
FUEL BURNING METHOD AND APPARATUS
Filed March 7, 1941  8 Sheets-Sheet 3
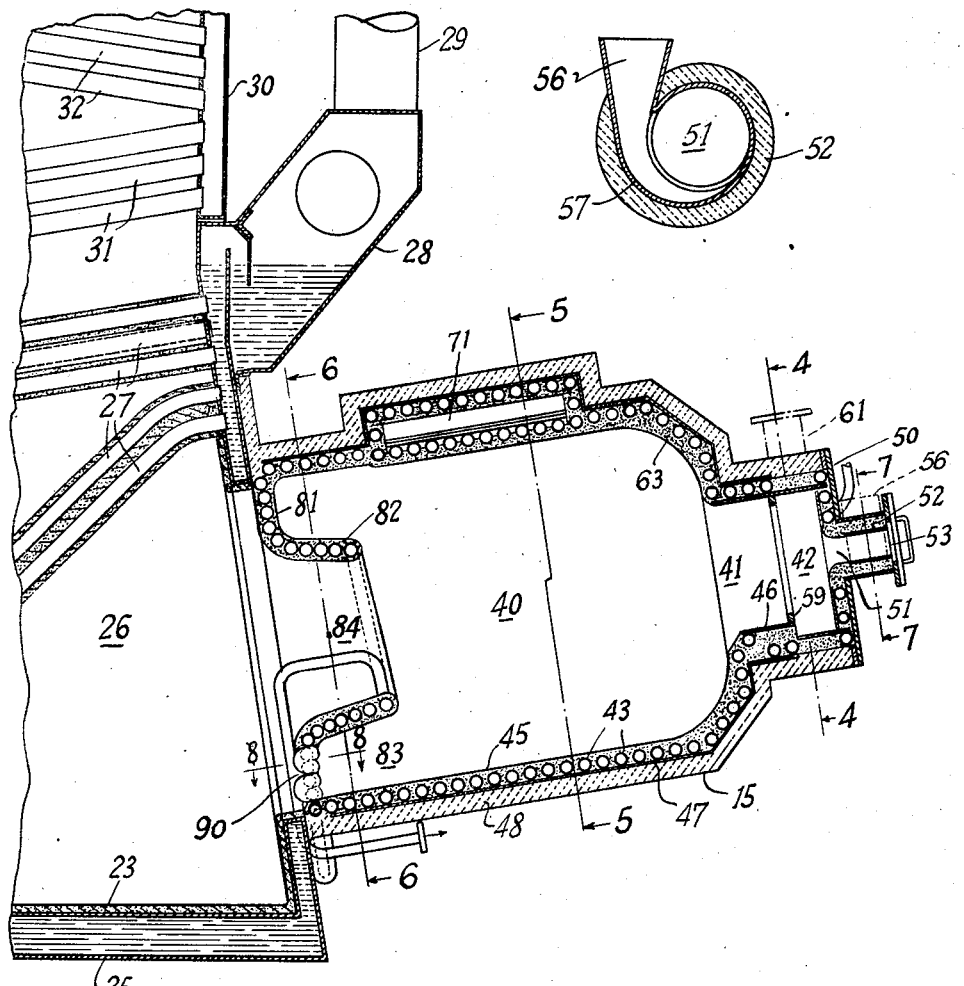
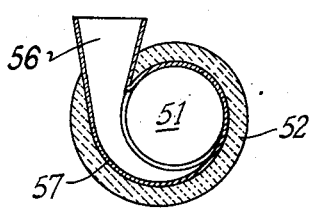
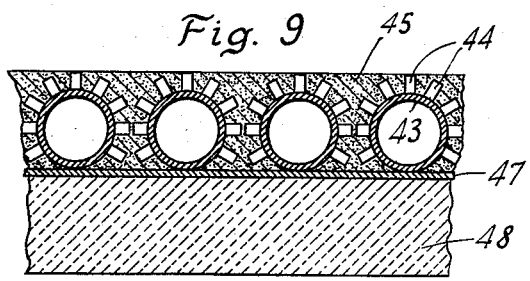
INVENTORS
Ervin G. Bailey, Howard J. Kerr,
James Fletcher, George A. Watts
and Lambert Kooistra
BY
Joseph P. Moran ATTORNEY.

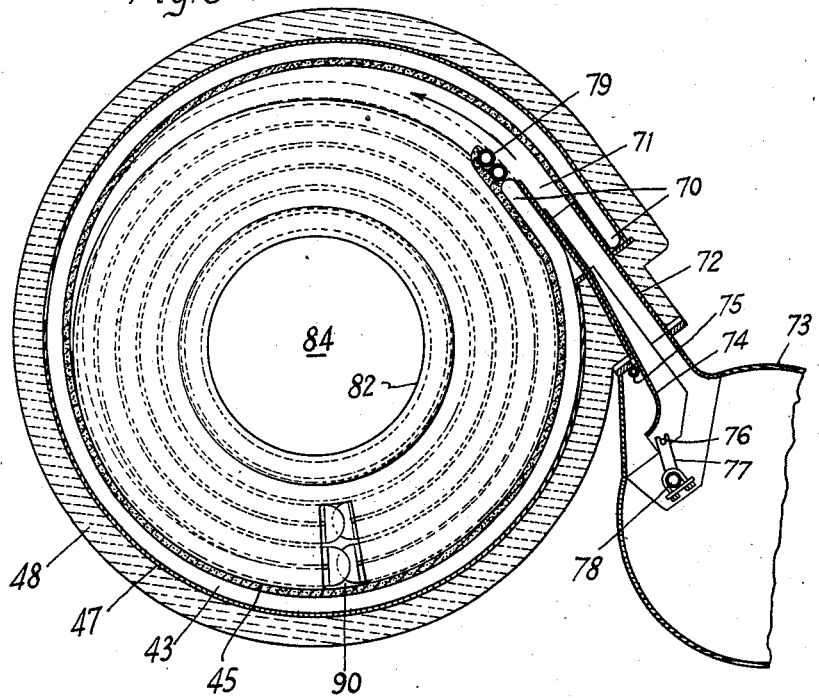
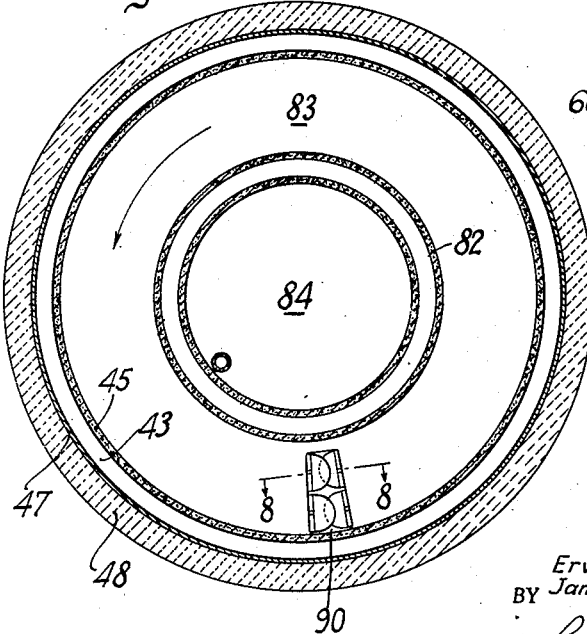
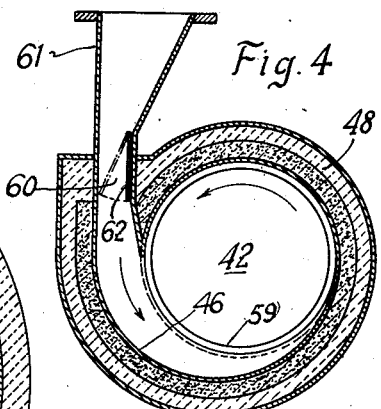
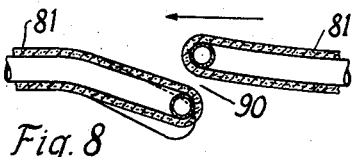

D = INSIDE DIAMETER IN FEET

DIMENSIONS OF CYCLONE FURNACE

| D IN FT. | INCHES FORMULA | 3 | 5 |
|---|---|---|---|
| A | 0.8 D | 2 7/16" | 4" |
| B | 2 D | 6" | 10" |
| C | 5.4 D | 16 1/4" | 2'-3" |
| E | 7.6 D | 23" | 3'-2" |
| F | 6 D | 1 3/4" | 3" |
| G | 5 D | 15" | 2'-1" |
| H | 3 D | 9" | 15" |
| L | 16 D | 4'-0" | 6'-8" |
| S 𝒇 | 6.75 D² | 60.75 | 169 |
| Q cu.ft. | 1.14 D³ | 30.8 | 142.3 |

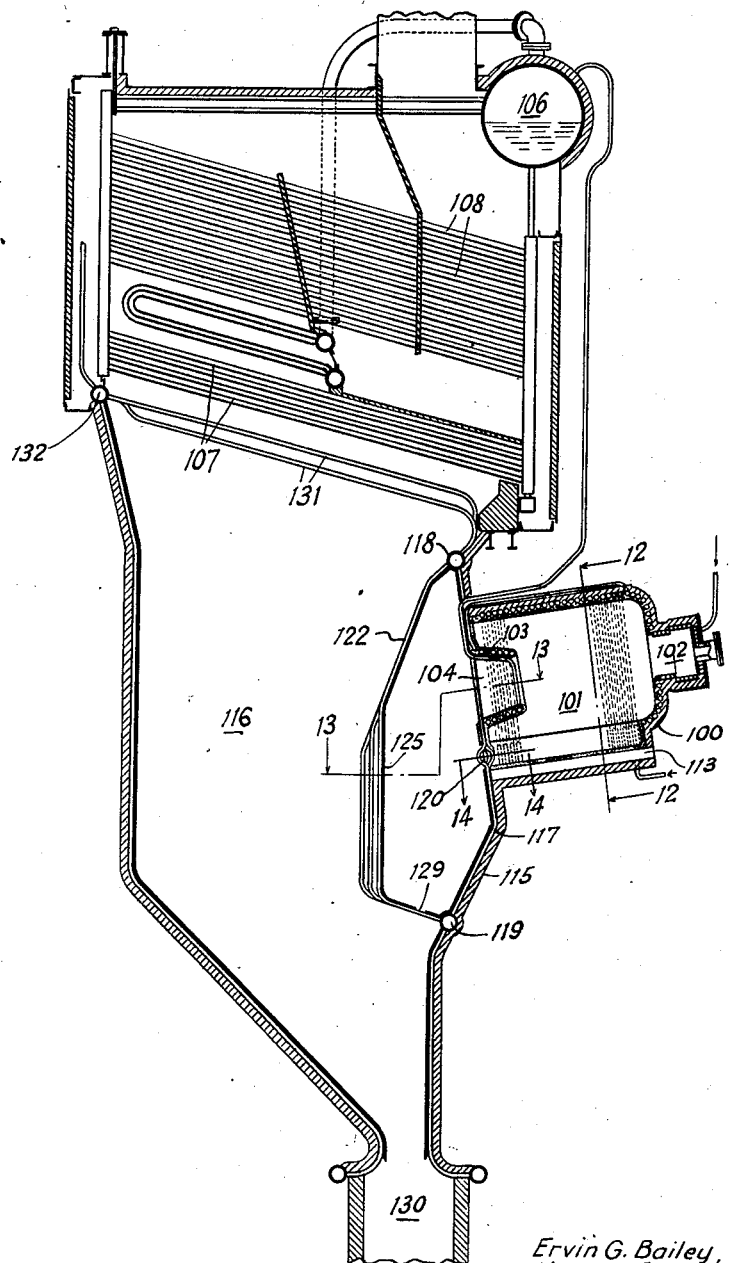

Sept. 5, 1944.  E. G. BAILEY ET AL  2,357,301
FUEL BURNING METHOD AND APPARATUS
Filed March 7, 1941  8 Sheets-Sheet 7
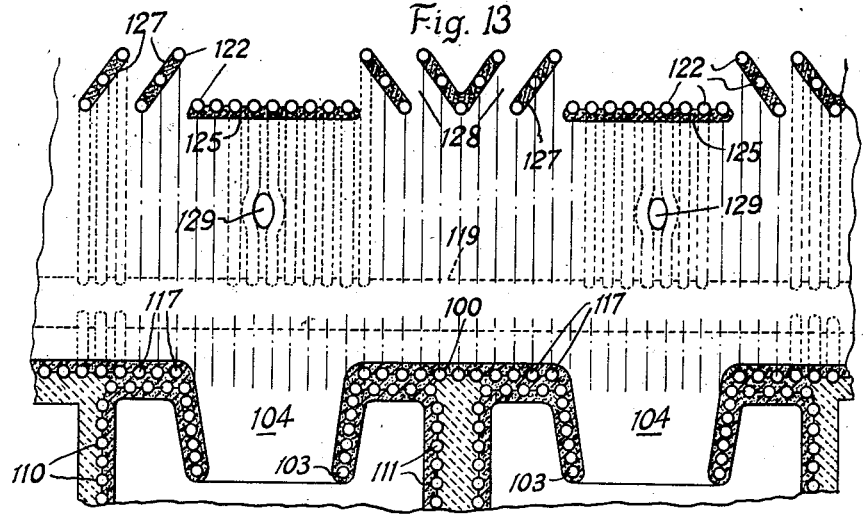
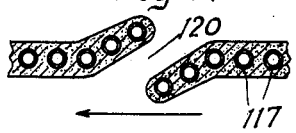
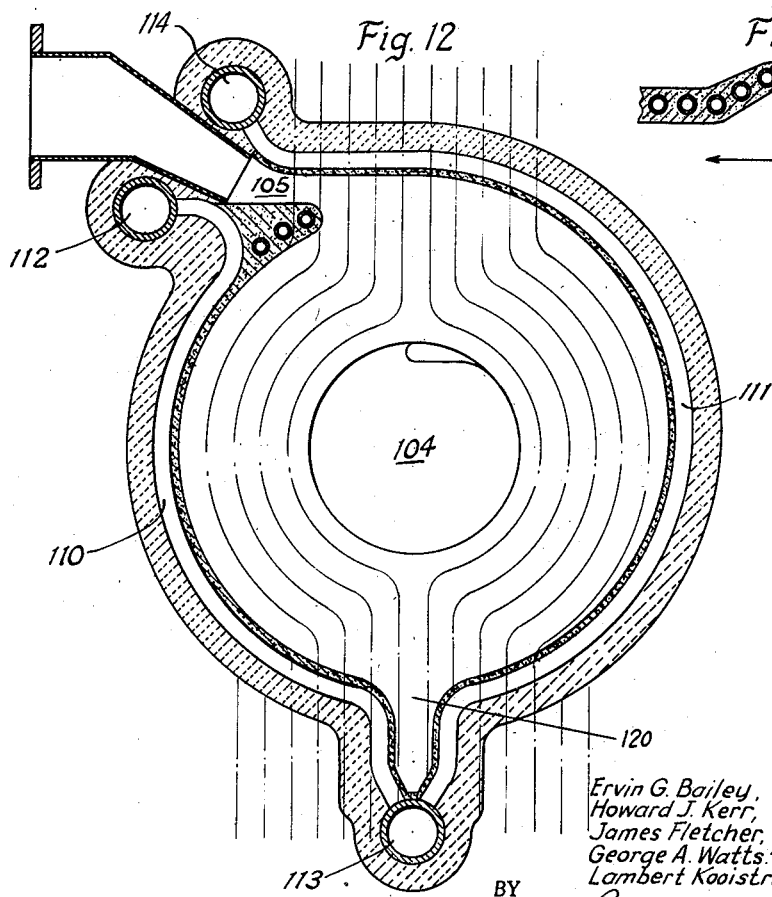
Ervin G. Bailey,
Howard J. Kerr,
James Fletcher, INVENTORS
George A. Watts and
Lambert Kooistra
BY
Attorney Sept. 5, 1944.  E. G. BAILEY ET AL  2,357,301
FUEL BURNING METHOD AND APPARATUS
Filed March 7, 1941  8 Sheets-Sheet 8

Ervin G. Bailey,
Howard J. Kerr,
James Fletcher, INVENTORS
George A. Watts, and
Lambert Kooistra
BY
Joseph P. Moran
Attorney Patented Sept. 5, 1944

2,357,301

UNITED STATES PATENT OFFICE

2,357,301

FUEL BURNING METHOD AND APPARATUS

Ervin G. Bailey, Easton, Pa., Howard J. Kerr, Westfield, N. J., and James Fletcher, Akron, George A. Watts, Barberton, and Lambert Kooistra, Akron, Ohio, assignors to The Babcock & Wilcox Company, Newark, N. J., a corporation of New Jersey Application March 7, 1941, Serial No. 382,262

28 Claims. (Cl. 122—336)

The present invention relates in general to an improved method of burning ash-containing solid fuels and to an improved construction and operation of fuel burning apparatus especially designed and particularly adapted for carrying out this method.

The most popular type of solid fuel burning furnace for modern high temperature high capacity steam generators is the pulverized fuel slag tap furnace. Such furnaces are usually designed for burning bituminous or semi-bituminous coals in a finely divided condition, a representative fuel size being 98% through a 50-mesh screen and 70% through a 200-mesh screen. In the operation of such furnaces, the furnace temperature is normally maintained above the fuel ash fusion temperature so that approximately 50% of the ash content of the fuel can be removed from the furnace chamber in a molten condition.

It has been proposed to burn solid fuels in a relatively coarse crushed or pulverized condition in small "cyclone" type furnaces consisting essentially of a hollow refractory lined cylinder closed at one end and having a gas discharge opening at the other end. Such furnaces were usually designed for the fuel and air for combustion to be introduced at relatively high velocities adjacent the closed end so as to form a rotating stream moving along the circumferential furnace wall and in which combustion of the fuel occurs, the gaseous products of combustion passing out of the gas discharge opening and the ash separating in the furnace being removed in a molten condition. While furnace designs of this type have been proposed over a long period (e. g. U. S. Patents 836,145 and 836,219) all efforts to employ the same commercially have been unsuccessful.

The general object of the present invention is the provision of an improved method of and apparatus for burning an ash-containing solid fuel which are mainly characterized by a high rate of heat release per cubic foot of furnace volume, a high fuel burning efficiency, and separation and removal of substantially all of the recoverable ash content of the fuel in a molten condition before the gases leave the furnace chamber. More specifically, the invention is concerned with an improved construction of a cyclone furnace and an improved method of burning crushed or coarsely pulverized ash-containing fuel in a furnace of this type. A further and more specific object of the invention is the provision of an improved construction for a cyclone furnace designed for operation with its main axis in a horizontal or substantially horizontal position which is particularly characterized by an improved construction and arrangement of the fuel inlet, the relative arrangement and proportioning of the various furnace chamber parts, and the construction and position of the furnace chamber slag outlet. Another specific object is provision of an improved construction of a steam generating unit especially adapted for firing by one or more cyclone furnaces of the character described. Another specific object is the provision of an improved construction of a wall inspection opening for a furnace chamber normally operating under a positive pressure.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described several embodiments of our invention.

Of the drawings:

Fig. 3 is an enlarged sectional view of a portion of the apparatus shown in Fig. 1;

Figure 10:
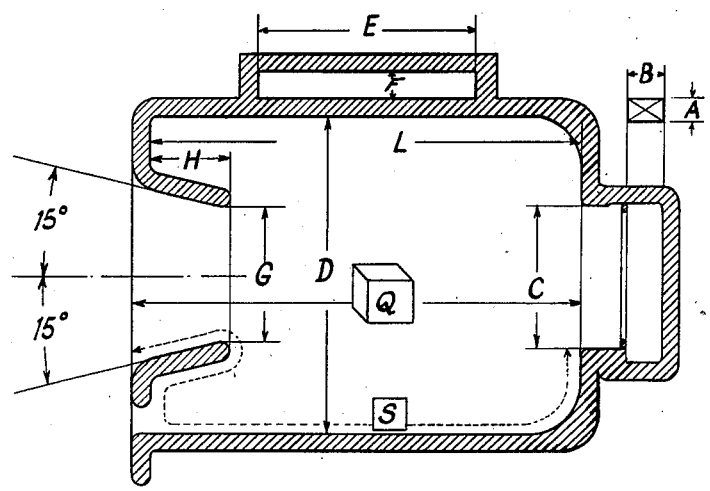
Figure 15:
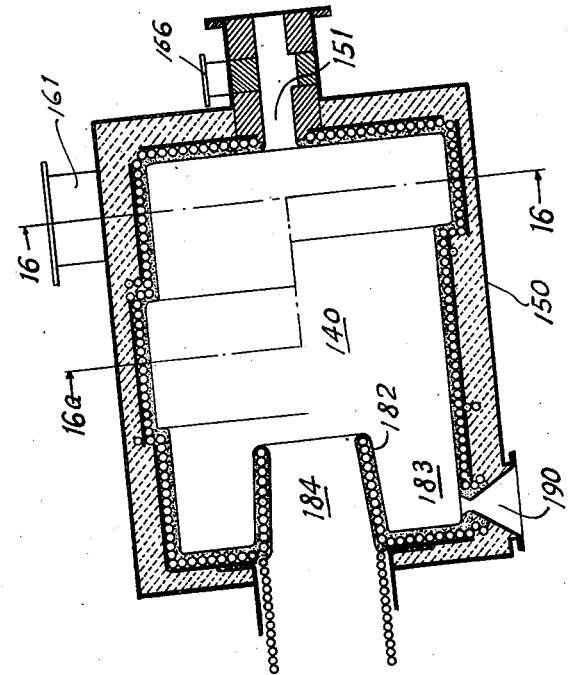

Figs. 4, 5, 6 and 7 are vertical sections taken on the lines 4—4, 5—5, 6—6, and 7—7 of Fig. 3 respectively;

Fig. 8 is a plan view taken on the line 8—8 of Fig. 3;

Fig. 9 is an enlarged view of a portion of the furnace wall shown in Fig. 3;

Fig. 10 is a diagrammatic view of the furnace shown in Fig. 3 with a table showing preferred furnace proportions;

Fig. 11 is a sectional elevation of a stationary steam generating unit having a furnace construction especially designed for and incorporating a cyclone furnace;

Figs. 12, 13 and 14 are sections taken on the lines 12—12, 13—13, and 14—14 respectively of Fig. 11;

Fig. 15 is a sectional view similar to Fig. 3; and

Figure 16:
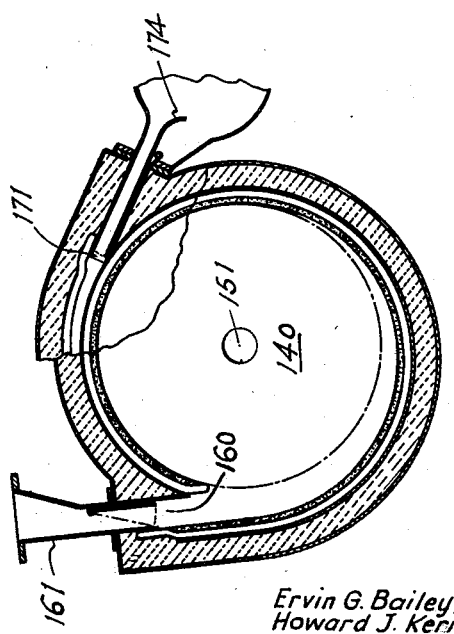

Fig. 16 is a section taken on the line 16—16 of Fig. 15, with a part broken away on the line 16—16ª.

Figure 1:
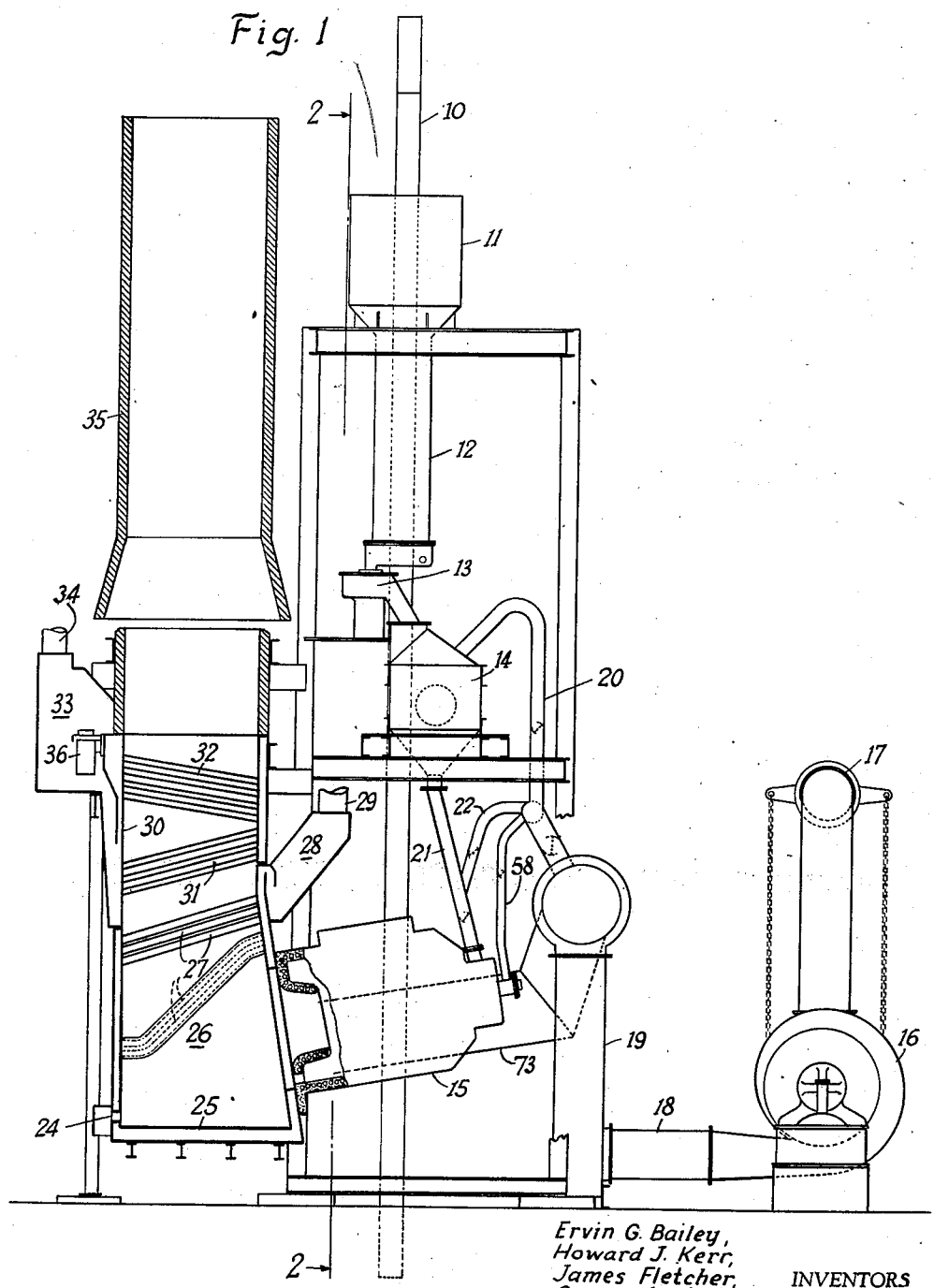
Fig. 1 is an elevation, partly in section, of an experimental test installation incorporating the present invention.
Figure 2:
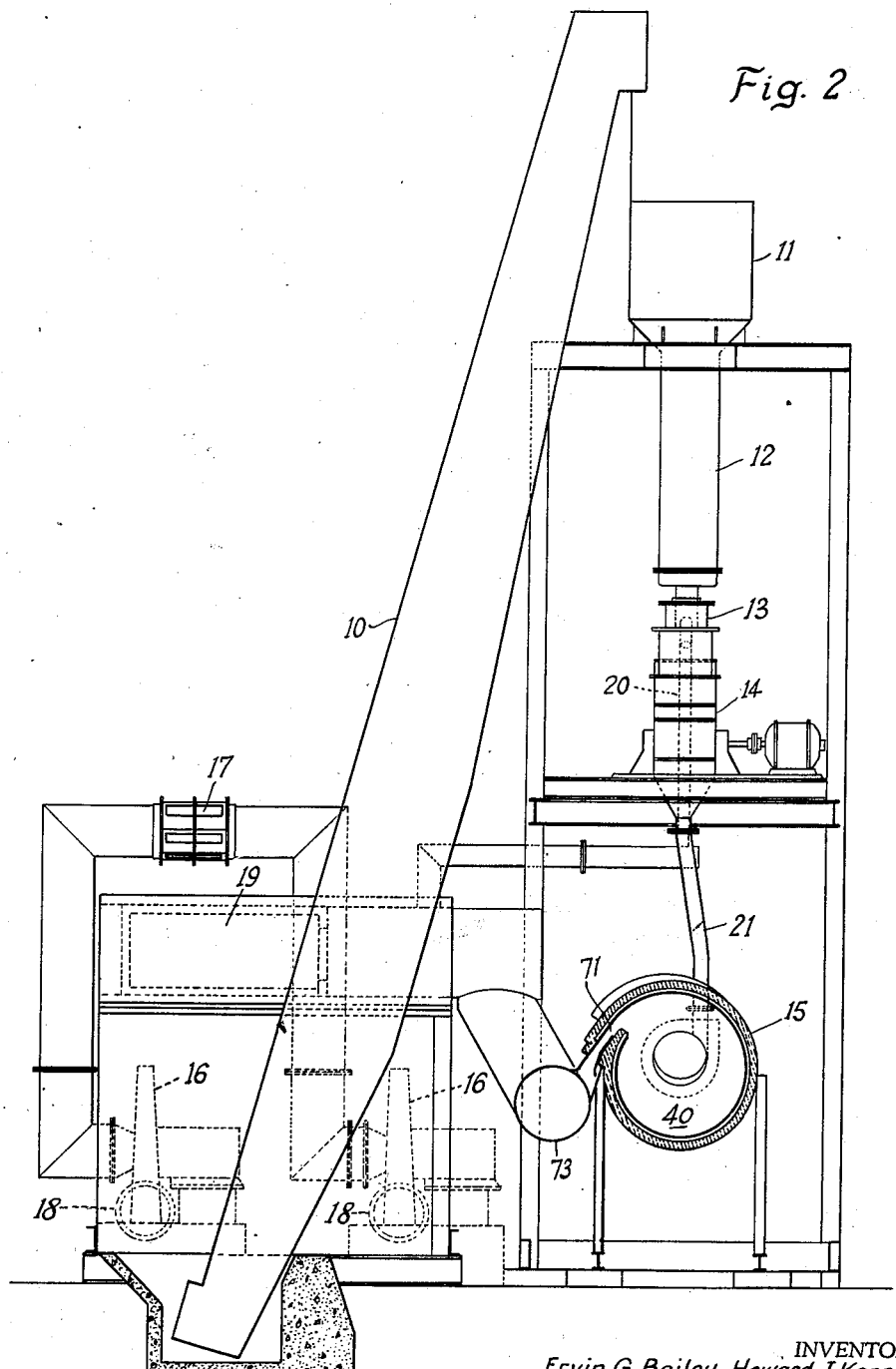
Fig. 2 is a vertical section taken on the line 2—2 of Fig. 1.

In the drawings, Figs. 1-9, the invention is illustrated as incorporated and used in an experimental test installation. As shown in Figs. 1 and 2, the test installation comprises a bucket elevator receiving raw coal at its lower end and discharging into a raw coal hopper 11. The hopper discharges through a pipe 12 to a table feeder 13, which feeds the coal at any desired rate to a crusher 14 discharging to the cyclone furnace 15. Preheated air is supplied to the installation by a pair of regulable air compressors 16 receiving a supply of air through a common balanced inlet valve 17 and discharging through pipes 18 into a combination water heated and gas fired air heater 19. A part of the preheated air supply is discharged through a branch air pipe 20 to the upper end of the crusher for the purpose of drying the coal while it is being reduced therein. A second branch air pipe 22 is connected to the crusher discharge pipe 21 for effecting a high velocity discharge of an air and coal mixture through the pipe 21 to the cyclone furnace 15.

In the installation illustrated, the cyclone furnace is a source of heat for an associated steam generating unit, divided into upper and lower generating sections. The lower section has a double-walled shell 25 forming an entirely water cooled furnace chamber 26 opening at one side thereof to the cyclone furnace and having a slag outlet 24 at its opposite side. The inner wall of the shell is studded with metallic studs and covered with a layer of refractory 23. Vertically spaced groups of refractory covered inclined slag screen tubes 27 extend across the secondary furnace chamber between opposite parts of the shell 25. The steam generated in the shell and tubes is collected in a steam dome 28 which discharges into a steam line 29. The upper section of the unit is formed by a rectangular double-walled shell 30 superposed on the shell 25 and having opposite side portions connected by water tube banks 31 and 32. The steam generated in the upper section is separated by cyclone separators 36 and collected in a steam dome 33 for discharge to a steam line 34. A stack 35 is mounted above the upper section with a space therebetween through which the condition of the stack gases can be observed and cooling air may enter the stack.

While various kinds of liquid, gaseous and solid fuels can be burned in the cyclone furnace constructions illustrated, the constructions illustrated and method hereinafter described are especially designed and particularly adapted for burning bituminous and semi-bituminous coals having an ash fusion temperature below 2800° F. and reduced to an aggregate or mixture of particle sizes not over ½". The fines in the mixture passing through a 200-mesh screen should be between 3% and 20%. Solid fuel of this character has been referred to as "granular" or "granulated" fuel. The volatile content of the coal may also vary considerably, ranging, for example, from 20% for a coal having an ash fusion temperature of 2350° F. to 40% for a coal with an ash fusion temperature of 2700° F. A certain percentage of fines in the mixture is desirable to aid ignition and promote combustion of the entering fuel, but an excessive amount is undesirable as the amount of ash leaving the furnace as fly ash is proportional. The larger the size of the coal particles, the less the amount of fly ash, but the higher the percentage of coarse particles, the higher the air velocity required to keep such particles in motion in the furnace until they are deposited on the slag-covered furnace walls. A consideration of all of the factors involved makes a relatively coarse fuel mixture most desirable. For example, a desirable mixture for bituminous coals having about 11% moisture, 16% ash, 39% volatiles, and a heat value of 10,300 B. t. u. per pound as fired, would be 98-100% through a 4-mesh screen, 40-50% through 30-mesh, 10-18% through 100-mesh, and 6-10% through a 200-mesh screen.

In accordance with this invention, fuel of the character described can be efficiently burned at high rates of heat release, with a small amount of excess air, and separation and removal of substantially all of the recoverable ash content of the fuel in a molten condition. In accordance with this method, a substantially cylindrical combustion space is provided with refractory faced walls which are fluid cooled sufficiently to maintain the refractory inner layer under the highest furnace temperature conditions attained in operation. The fuel to be burned is introduced adjacent one end of the circumferential furnace wall in a high velocity stream of primary air and fuel particles in suspension therein. The air supplied to the furnace both as primary and secondary combustion air is preferably preheated a substantial amount to speed up the ignition of the fuel adjacent the point of air entry. In order to secure the maximum centrifugal effect, the primary air-fuel stream is introduced through a relatively narrow axially elongated port arranged tangentially to a circumferential wall section shaped in the form of an involute. A whirling stream of auxiliary primary air may be advantageously introduced within and concentrically of the main primary air-fuel stream as it enters the furnace chamber. The primary air-fuel stream flows longitudinally of the combustion chamber at a high angular velocity in a film or layer following a helical path along and in contact with the circumferential wall of the chamber. The high temperature maintained in the furnace chamber causes the entering fuel particles to pass rapidly through the stages of swelling, agglutinating, gasification, and ignition and burning of the combustible gases and fixed carbon.

The carrier or primary air entering with the fuel stream forms only a relatively small portion of the total combustion air supplied to the furnace, preferably not more than 25%. In the combustion method described herein the total amount of air supplied to the furnace can be advantageously limited to only a small amount in excess of the theoretical combustion air requirements, preferably less than 15% excess air. A low excess air is particularly desirable at higher coal rates and with the higher ash fusion coals. The remaining portion of this air is supplied to the furnace chamber in a manner and under conditions which effect a rapid combustion of substantially all of the combustible constituents and release of the ash constituents of the fuel. In accordance with the invention substantially all of the secondary air for combustion is supplied to the furnace chamber in a single high velocity high temperature stream flattened axially of the furnace chamber, and at a linear velocity as it enters the furnace chamber substantially the same as that of the entering primary air-fuel stream. The secondary air is introduced into the furnace chamber in a stream elongated axially of the furnace chamber and at a position tangential to a circumferential wall section shaped in the form of an involute, and in a direction providing a direction of rotation in the combustion chamber of the secondary air stream similar to that of the primary air-fuel stream. The flattened secondary air-stream is preferably introduced over a substantial portion of the length of the furnace chamber between the point of fuel entry and the furnace gas outlet and spaced from the entering fuel stream sufficiently to permit combustion of the fines in the fuel stream to be substantially completed and the primary air-fuel stream to be whirling along and in contact with the circumferential wall before being contacted by the secondary air stream.

With the secondary air entering the furnace chamber as described, there will be a gradual merging of the secondary air stream with the burning stream of primary air and fuel, without disrupting the helical flow path of the latter or separating the primary air-fuel stream from the circumferential furnace chamber wall by a layer of secondary air.

With the described method of fuel and air admission to the furnace chamber, combustion of the fuel particles will progress at a high rate, which increases in the zone of secondary air admission. The normal mean temperature in the furnace chamber can be easily maintained over a wide range of operation substantially above the fuel ash fusion temperature. Under such combustion conditions, the ash content of the fuel is rapidly released and due to the centrifugal effect thereon, the furnace chamber walls, and particularly the circumferential wall, will be rapidly coated with a film of molten ash or slag which adheres to the refractory inner surface of the furnace walls and provides a sticky surface against which the fuel particles in the contacting fuel-air stream are thrown and to which they adhere. The whirling stream of burning fuel and gases effects a scrubbing and burning of the fuel particles on the slag film on the furnace wall. Most of the lighter fuel particles burn in suspension while in the whirling stream along the circumferential wall and the heavier fuel particles on the chamber walls, the slag coating thereon acting to retard the travel of the fuel particles and to retain them in the furnace chamber until combustion is complete. The slag coating or film on the furnace walls rapidly reaches an equilibrium thickness dependent upon the relative values of the ash fusion temperature, the mean furnace temperature maintained, the furnace wall temperature, and the velocity of the contacting gas stream. As additional ash deposits on the walls, it will flow down to the bottom of the furnace chamber under the action of gravity.

With the described operating conditions the furnace chamber will be normally under a substantial mean pressure, such as 5–15″ H2O, which condition promotes the flow of the furnace gases and separated slag towards their respective discharge openings. The furnace gas outlet is advantageously concentrically arranged at a position within the transverse cross-sectional area of the furnace chamber which requires a relatively abrupt reversal of the whirling gas stream axially of the furnace chamber before it can reach the gas outlet. This reversal in the flow path facilitates the separation of suspended slag particles from the outgoing gases and retards the passage of combustibles from the furnace chamber. The flow reversing zone is so arranged that incompletely burned fuel particles will separate out of the gas stream and be constantly agitated and scrubbed by the gases while moving around a slag coated annular pocket surrounding the gas outlet. These fuel particles will remain in the annular pocket, either partly embedded in the slag surface or moving around the pocket, until all of the combustible is consumed and the ash content released. The ash released either remains on the wall surfaces of the pocket or flows down the walls thereof to join the slag on the furnace bottom and be removed therewith The molten slag collecting in the bottom of the furnace chamber is removed therefrom through a slag outlet arranged at a high temperature point in the gas outlet end and towards which the slag tends to flow. The slag outlet is so arranged that the main gas stream flow path is unaffected and any furnace gases passing out through the slag outlet are required to make an abrupt change in direction before entering the same.

The furnace gases leaving the flow reversing zone are withdrawn through a concentric gas outlet of the maximum flow area permissible in that end of the furnace to thereby lessen the gas pressure drop into an adjoining secondary furnace chamber. This chamber is of sufficient volume to substantially reduce the velocity of the outgoing gases and permit any slag particles in suspension to separate before the gases reach any closely spaced water tube bank.

While variations in the position of the furnace chamber and the relative arrangement of the parts thereof are permissible, as more specifically described in the related copending applications of applicants Kerr, Fletcher, Watts and Kooistra, Serial Nos. 382,263 and 382,264, filed March 7, 1941, the preferred arrangement for carrying out the described process from the standpoint of fuel-burning capacity and efficiency, slag separation and removal, and continuity of furnace operation, is that illustrated in Figs. 1–9, in which the cylindrical furnace chamber is arranged with its axis substantially horizontal, with the primary air-fuel stream entering through a fuel inlet port at one end of the main furnace chamber, the gas outlet and slag outlet at the opposite end, and the secondary air in a single flattened stream tangentially introduced along a substantial portion of the length of the furnace chamber.

Specifically, the cyclone furnace 15 for carrying out the described fuel burning method comprises a main or primary furnace chamber 40 of substantially cylindrical formation having a circular fuel inlet opening in one end wall thereof leading from a fuel inlet chamber which is concentric with and of smaller diameter than the main furnace chamber 40. The fuel inlet chamber is divided into an inner cylindrical discharge section 41 which opens into the main furnace chamber and an outer fuel inlet section 42 in which about one-half the circumferential wall is shaped as an involute and the remaining portion is of the same diameter as the discharge section. The fuel inlet and furnace chambers are defined and fluid cooled by a water tube 43 bent into the form of a stepped coil. The portions of the tube 43 defining the walls of the furnace chamber 40 are closely spaced and provided with metallic studs 44 on one side, as shown in Fig. 9, which are covered with a layer of suitable refractory 45, such as plastic chrome ore, to form refractory faced water cooled inner wall surfaces for the furnace chamber. Unstudded portions define the circumferential wall of the fuel inlet chamber discharge section 41 and are covered on their inner side by a smooth metal plate 46 welded thereon. The plate 46 is extended to form the circumferential wall of the fuel inlet section 42 also. The tube portions in the outer walls of the two chambers are covered on their outer sides by a correspondingly shaped metal plate 47 welded to these tube portions and a layer of heat insulating material 48.

As shown in Figs. 3, 4 and 7, the fuel inlet chamber section 42 has a fluid cooled circular outer end wall 50 with a central opening 51 therein which forms an advantageous location for the insertion of an oil or gas burner to start up the furnace and as an inspection opening during operation. The surrounding portion of the end wall is axially extended, as indicated at 52, to form a continuation of the ouening 51. The small chamber so formed has its outer end closed by a removable cover 53 in which a glass registers with the opening 51. The cover glass is kept relatively cool and the opening 51 maintained clear by an air nozzle 56 connected to the preheated air supply duct by a damper controlled branch pipe 58 and arranged tangentially to a sector 57 of the circumferential wall of the chamber 51 shaped in the form of an involute, as shown in Fig. 7. A small high velocity whirling stream of auxiliary primary air is thus supplied to the chamber 51 rotating in the same direction therein as the stream in the fuel inlet chamber 42. This whirling air stream passing centrally through the fuel inlet chamber appears to prevent the presence of fines in the central part of that chamber and thus to minimize combustion of the fuel while in that chamber. It also aids the expansion of the primary air-fuel stream towards the circumferential wall of the furnace chamber 40. This construction of an outer wall opening is particularly advantageous for a chamber under pressure, as when the cover 53 is opened, the swirling air stream in the chamber 51 creates an appreciable suction into the furnace, preventing the discharge of flame or hot gases through the chamber 51.

The involute curved portion of the plate 46 lining the circumferential wall portion of the fuel inlet section 42 is extended to form a narrow axially elongated primary air-fuel inlet port 60, positioned tangentially to the upper and outer end thereof, as indicated in Fig. 4. The plate portions defining the port 60 are extended to form a downwardly tapering nozzle 61 having its upper end connected to the crusher discharge pipe 21. The primary air-fuel stream entering through the inlet 60 will have a counterclockwise direction of rotation in the fuel inlet chamber, as seen in Fig. 4. An annular flange 59 projects radially inward at the outer end of the discharge section 41 which provides a uniform distribution of the fuel stream circumferentially of that cylindrical section. The velocity of the primary air-fuel stream in the port 60 is controlled without changing the position of the stream relative to the circumferential wall by a manually operable hinged damper 62. The primary air-fuel stream discharges in a whirling peripherally expanding stream through the circular end of the section 41 into the main furnace chamber 40. The described fuel inlet chamber construction and arrangement in conjunction with a refractory fillet 63 around the adjacent end of the furnace chamber 40 eliminates coke and slag accumulations at that end of the furnace chamber.

The circumferential wall portion of the main furnace chamber used for the entrance of the secondary air has parallel tube portions broken and serially connected by overlapping spaced groups of 180° bends 70 to define a narrow port 71 tangentially arranged to the lower end of a 180° sector of the chamber wall shaped in the form of an involute and located at such a position that the trailing edge portion of the port is in a substantially vertical position, to minimize slag eyebrow formations in this zone. The port 71 preferably extends along approximately half the length of the furnace chamber 40. One of the end return bends is bent laterally and extended along the length of the port 71 to form a straight edged trailing edge portion, as shown at 79, and provided with studs and refractory on its underside. The secondary air port 71 is occupied by the inner end of a horizontally arranged tapering nozzle 72 which opens at its enlarged outer end to a preheated air supply pipe 73.

With this arrangement the secondary air stream will enter the furnace at a circumferential point about 126° angularly from and behind the position of the primary air-fuel inlet port 60 and with the same direction of rotation as the primary air-fuel and auxiliary primary air streams. The effective flow area of the secondary air inlet, and thus the velocity and quantity of the secondary air, is controllable without changing the position of the entering air stream relative to the circumferential wall of the furnace chamber by means of a slotted plate damper 74 hingedly mounted at 75 to permit movement of the damper towards and away from the outer side of the air nozzle 72 by means of damper operating mechanism comprising pins 76 on the outer end of the damper positioned in corresponding slotted bars 77 mounted on a shaft 78 which can be manually or automatically operated.

The rear end of the furnace chamber 40 is provided with a gas outlet so arranged that the rearwardly moving whirling gas stream is forced to move inwardly and forwardly, and thus abruptly change its direction axially of the furnace chamber, before reaching the outlet and without disrupting its whirling movement. The rear or discharge end of the furnace chamber is defined by a water tube coil portion having an outer annular section 81 and a central forwardly tapering throat section 82 concentric with and projecting into the furnace chamber 40 to a point rearwardly of the rear end of the secondary air port 71. These tube portions are studded on both sides and covered with refractory. The described construction results in the formation of an annular pocket 83 between the throat 82 and the circumferential furnace wall, open at its forward end and due to which the whirling gas stream will be contracted radially and have its direction of movement axially reversed before entering the gas outlet 84 defined by the throat 82. The gas outlet 84 is of substantial cross-sectional area and flares toward the secondary furnace chamber 26 with its walls at an angle of approximately 15° to its axis. The relatively clean furnace gases discharge through the gas outlet 84 and enter the secondary furnace chamber 26 which is of substantially larger volume than the main furnace chamber. The lower gas velocity in the secondary furnace chamber facilitates the separation of any slag particles in suspension.

In the construction illustrated the slag outlet from the furnace chamber 40 is located in the annular end wall portion 81 adjacent the bottom of the furnace chamber at a point slightly beyond the vertical center line thereof in the direction of gas movement. The slag outlet 90 is formed as illustrated in Fig. 8 by arranging the tube coil in angularly spaced pairs of 180° bends and bending the reversed tube portions in opposite directions and to different amounts, so that the outlet will require an abrupt change in direction of any gas passing therethrough and yet be of sufficent he'ght to permit a gas flow therethrough above the normal slag level, without substantially changing the contour of the inner end wall of the furnace chamber. The upper bend portions are relatively arranged so that the upper part of the slag opening is narrower than the lower section. The arrow in Fig. 8 indicates the direction of furnace gas flow relative to the slag outlet. The separated slag flowing down the furnace walls and along the furnace bottom towards the slag outlet 90 has its movement facilitated by the slight inclination given to the furnace chamber. The slag discharging through the outlet 90 flows along the bottom of the secondary furnace chamber 26 and with any slag separating therein is discharged through the slag outlet 24.

We have found that the proportions of the various parts of the furnace play a highly important part in the operating characteristics of a furnace of this type. The various dimensions cannot be varied in the same proportion for different size furnaces, as, for example, the area of the wall surface of the main furnace chamber will vary as the square of the diameter, whereas, the volume of that chamber will vary with the cube of the diameter. We have determined that the main dimensions of any size furnace should preferably be in the approximate proportions indicated in Fig. 10. The table included in that figure states the relation of the dimensions indicated in the diagrammatic figure in inches relative to the furnace chamber diameter in feet. The numerical values for the corresponding dimensions of furnaces three and five feet in diameter respectively, are given in the last two columns. Of the dimensions noted A and B are the width and length respectively of the fuel inlet, C the diameter of the opening 41, E and F the length and width respectively of the secondary air inlet, G the minimum diameter of the throat 82, H the depth of the throat section 82, and L the length of the furnace chamber 40. The relation of the area S of the surface in the chamber 40 contacted by the gases, and of the volume Q of that chamber is also given.

By way of example, and not of limitation, one 24-hour test run of a five foot diameter cyclone furnace in the experimental installation illustrated in Figs. 1-9, gave the following values which indicate representative conditions to be maintained in the furnace in accordance with the present method.

The coal used was Kincaid coal having the following proximate analysis:

| | | |
|---|---|---|
| Volatile matter | per cent | 42.2 |
| Fixed carbon | do | 41.4 |
| Ash | do | 16.4 |
| Moisture (as fired) | do | 11.8 |
| Heat value as fired | B. t. u./lb | 10421 |
| Ash fusion temperature | °F | 2350 |

The coal as fired was a crushed coarse mixture sizing:

| | Per cent |
|---|---|
| Through #4 screen | 100 |
| Through #10 screen | 94.1 |
| Through #30 screen | 45.6 |
| Through #50 screen | 27.2 |
| Through #100 screen | 13.2 |
| Through #200 screen | 6.7 |

The coal was fired at a rate of 7110 lbs. per hr. The total combustion air supplied was 61,452 lbs. per hr. equivalent to 7.0% excess air. Of the air, 19.75% was primary air, the remaining part being secondary air, except for 1 or 2% used as auxiliary primary air. The air pressure in the inlet ducts was approximately 32 in. $H_2O$. The primary air temperature was 280° F., and the secondary air temperature 345° F. The calculated gas temperature at the primary furnace exit was 3510° F. and at the secondary furnace outlet 3055° F. Average gas analysis in the secondary furnace showed $CO_2$ 16.99%, $O_2$ 1.46%, and CO 0.0%. The ash recovered as molten slag from the furnace was 97.5% of the recoverable ash content of the fuel as fired. The heat release rate in the primary furnace was 548,000 B. t. u. per cubic foot per hr. A slag analysis showed the presence of only 0.2% combustible in the slag.

In Figs. 11-14 we have illustrated a natural circulation stationary steam generator unit fired by several cyclone furnaces of the general type illustrated in Figs. 1-9. The illustrated unit includes a plurality of cyclone furnaces 100, each having a horizontally inclined primary furnace chamber 101, a primary air-fuel inlet port 102, a throat section 103, a gas outlet 104, and a secondary air inlet 105. In this construction the cyclone furnace wall cooling system is divided into two independent sections. The fuel inlet chamber walls and adjacent end wall of the primary furnace are defined by a single coil 109 receiving a supply of feed water from a feed pump as indicated. This coil is connected in series with a coil defining throat 103 and gas outlet 104, the opposite end of which is connected to the feed connection of the main steam and water drum 106. The main steam generating section of the unit is formed by horizontally inclined spaced banks of water tubes 107, 108, connected to the steam and water drum 106 in a well known manner. The circumferential wall of the cyclone furnace also has its fluid cooling provisions connected into the boiler circulation system. This wall is defined by oppositely curved rows of water tubes 110 and 111, the tube row 110 extending between an inlet header 112 and an intermediate bottom header 113, while the tube row 111 extends between the header 113 and an outlet header 114, as indicated in Fig. 12. The headers 112 and 114 are connected to spaced portions of the boiler circulating system.

The cyclone furnaces 100 are arranged in a row along the front wall 115 of a common laterally adjacent secondary furnace chamber 116 having the wall 115 defined by a row of tubes 117 extending across the discharge end of the cyclone furnace between upper and lower wall headers 118 and 119 respectively. The intertube spaces in the tube row 117 are closed by refractory except the bent tube portions defining a slag outlet 120 and surrounding the furnace gas outlet 104. The secondary furnace chamber has a second row of water tubes 122 connecting the headers 118 and 119 and spaced from the discharge end of the cyclone furnaces. The tubes 122 have their intertube spaces closed by suitable refractory to a point approximately the level of the slag outlet 120. Below this level the tubes 122 are arranged as illustrated in Fig. 13, spaced tube groups being in transverse alignment and covered by refractory to form closed barriers 125 in alignment with the gas outlets from corresponding cyclone furnaces. Some of the tubes 122 are bent to form slag holes 129 at spaced points adjacent the header 119. The tubes 122 at opposite sides of each barrier 125 are arranged in transversely spaced oblique symmetrically arranged groups 127 closed by suitable refractory. The spaces between the tube groups 127 serve as gas discharge passages 128 through which the cyclone furnace gases flow into the main portion of the secondary furnace chamber 116. The slag discharged through the slag outlets 120 flows down through the slag holes 129 and drops into an ash pit 130 below the secondary furnace chamber along with ash and slag particles separated in that chamber. A row of tubes 131 extends upwardly from the header 118 and thence across the outlet from the secondary furnace chamber, these tube portions being staggered to form a slag screen immediately below the lowermost boiler bank. The tubes 131 discharge into a header 132. The headers 119 and 132 are connected into the boiler circulation, so as to maintain a fluid flow through the tubes 117 and 122. This arrangement provides an adequate fluid cooling of the slag screen and associated furnace parts, and insures an effective separation of all the recoverable ash constituents of the fuel before the gases reach the main boiler banks.

While the arrangement of the primary air-fuel inlet in one end wall of the furnace chamber and the secondary air inlet in the relative position described is the preferred arrangement, the invention in its broader aspects may be carried out with the primary air-fuel and secondary air inlets in other positions. For example, in Figs. 15 and 16, the cyclone furnace 150 is horizontally inclined and the fluid cooled furnace chamber 140 substantially cylindrical with a gas outlet 184 and surrounding flow reversing annular pocket 183 defined by a fluid cooled throat 182. Secondary air is introduced along an involute curved section of the circumferential wall through a tangentially arranged elongated port 171 controlled by a damper 174. The primary air-fuel stream is introduced in this construction through a port 160 and damper controlled nozzle 161, the inlet port being arranged tangential to an involute curved fluid cooled section of the circumferential wall of the furnace chamber adjacent the outer end wall of the chamber. Auxiliary primary air is introduced in a high velocity whirling stream centrally of the furnace chamber through a chamber 151 in its end wall supplied by a tangentially arranged nozzle 156. A slag outlet 190 is located in the furnace chamber bottom adjacent the rear end wall.

With this arrangement of the inlet ports, the primary air-fuel stream is introduced into the furnace chamber at a high velocity along the circumferential wall thereof and a whirling movement of the fuel and air effected rearwardly along the wall in a helical path. The operation is otherwise substantially similar to that previously described.

While in accordance with the provisions of the statutes we have illustrated and described herein the best forms of the invention now known to us, those skilled in the art will understand that changes may be made in the process and apparatus disclosed without departing from the spirit of the invention covered by the claims, and that certain features of the invention may sometimes be used to advantage without a corresponding use of other features.

We claim:

1. The process of burning an ash-containing solid fuel at high rates of heat release which comprises introducing a stream of air and fuel in suspension at a high velocity into a combustion chamber of substantially circular cross-section so as to move at a high velocity along the circumferential wall thereof while maintaining a normal mean temperature in the chamber above the fuel ash fusion temperature, introducing a high velocity stream of combustion air tangentially to the circumferential wall of the combustion chamber and between the point of fuel introduction and the gas outlet from the chamber, causing the fuel and air so introduced to move axially of the combustion chamber towards the gas discharge end thereof through a helical path along the circumferential wall of the combustion chamber of sufficient length to cause combustion of the fuel and the release of substantially all of the recoverable ash in the fuel therein and the deposition of slag on the circumferential wall to form a sticky surface thereon to which fuel particles adhere and are scrubbed by the contacting gases, causing the furnace gases to be deflected at the gas discharge end of the combustion chamber inwardly towards the axis of the chamber and to discharge from said end of the chamber at a high velocity, and collecting and withdrawing the ash separated in the combustion chamber in a molten condition from the lower part of the chamber.

2. The process of burning an ash-containing granular fuel at high rates of heat release which comprises continuously introducing a stream of air and fuel in suspension at a high velocity into a combustion chamber of substantially circular cross-section so as to move at a high velocity along the circumferential wall thereof while maintaining a normal mean temperature in the chamber above the fuel ash fusion temperature, introducing a high velocity stream of combustion air tangentially to the circumferential wall of the combustion chamber and between the point of fuel introduction and the gas outlet from the chamber, causing the fuel and air so introduced to move axially of the combustion chamber towards the gas discharge end thereof through a helical path along the circumferential wall of the combustion chamber of sufficient length to cause combustion of the fuel and the release of fuel ash in a condition to form a sticky surface on the circumferential wall to which fuel particles adhere and are scrubbed by the contacting gases, causing the furnace gases to be deflected at the gas discharge end of the combustion chamber inwardly and reversely towards the axis of the chamber and to discharge from said end of the chamber at a high velocity, and collecting and withdrawing the ash separated in the combustion chamber in a molten condition from the lower part of the chamber adjacent the gas outlet.

3. The process of burning an ash-containing solid fuel at high rates of heat release which comprises continuously introducing a stream of air and fuel in suspension at a high velocity into a substantially cylindrical combustion chamber so as to move at a high velocity along the circumferential wall thereof while maintaining a normal mean temperature therein above the fuel ash fusion temperature, introducing substantially all of the remaining air required for combustion in a single high velocity stream tangentially to the circumferential wall of the combustion chamber and between the point of entry of the fuel stream and the chamber gas outlet, causing the fuel and air so introduced to move axially of the combustion chamber through a helical path along the circumferential wall of the combustion chamber of sufficient length to cause combustion of the fuel and the release of substantially all of the recoverable ash in the fuel therein and the deposition of slag on the circumferential wall to form a sticky surface thereon to which fuel particles adhere and are scrubbed by the contacting gases, causing the furnace gases to be deflected at the gas discharge end of the combustion chamber inwardly towards the axis of the chamber and to discharge from said end of the chamber at a high velocity, and collecting and withdrawing the ash separated in the combustion chamber in a molten condition from the lower part of the chamber.

4. The process of burning an ash-containing solid fuel at high rates of heat release which comprises continuously introducing a transversely flattened stream of primary air and fuel in suspension at a high velocity into a substantially cylindrical combustion chamber so as to contact with and move along the circumferential wall thereof while exposed to a normal mean temperature therein normally above the fuel ash fusion temperature, introducing substantially all of the remaining air required for combustion in a single transversely flattened stream tangentially to the circumferential wall of the combustion chamber between the point of initial contact of the fuel stream with the circumferential wall and the chamber gas outlet, causing the fuel and air so introduced to move axially of the combustion chamber through a helical path along the circumferential wall of the combustion chamber of sufficient length to cause combustion of the fuel and the release of substantially all of the recoverable ash in the fuel in a molten condition therein and the deposition of slag on the circumferential wall to form a sticky surface thereon to which fuel particles adhere and are scrubbed by the contacting gases, causing the furnace gases to be deflected at the gas discharge end of the combustion chamber inwardly and reversely towards the axis of the chamber and to discharge from said end of the chamber at a high velocity, and collecting and withdrawing the ash separated in the combustion chamber in a molten condition from the lower part of the chamber.

5. The process of burning an ash-containing solid fuel at high rates of heat release which comprises whirling a stream of primary air and fuel in suspension at a high angular velocity along a substantially cylindrical refractory faced combustion chamber wall arranged about a substantially horizontal axis while maintaining a normal mean temperature in the enclosed space above the fuel ash fusion temperature, continuously introducing a high velocity stream of combustion air tangentially to the combustion chamber wall between the point of fuel entry and the chamber gas outlet, causing the fuel and air so introduced to move horizontally along the combustion chamber wall towards the gas outlet end of the chamber through a helical path about a horizontal axis of sufficient length to cause combustion of the fuel and the release of substantially all of the recoverable ash in the fuel therein and the formation of a slag layer on the circumferential wall to which fuel particles adhere and are scrubbed by the contacting gases, causing the furnace gases to be deflected at the gas outlet end of the combustion chamber inwardly towards the axis of the chamber and the gaseous products of combustion to discharge through said end, and collecting and withdrawing the ash separated in the combustion chamber in a molten condition from the lower part of the chamber.

6. The process of burning an ash-containing solid fuel at high rates of heat release which comprises continuously introducing a whirling stream of primary air and fuel in suspension at a high angular velocity into one end of a combustion chamber of substantially circular cross-section arranged with its axis substantially horizontal and having a normal mean temperature therein above the fuel ash fusion temperature, continuously introducing a high velocity stream of combustion air tangentially to the circumferential wall of the combustion chamber wall between the point of fuel entry and the chamber gas outlet, causing the fuel and air so introduced to move axially of the combustion chamber through a helical path about a horizontal axis along the circumferential wall of sufficient length to cause combustion of the fuel and the release of substantially all of the recoverable ash in the fuel in a molten condition therein and the formation of a slag layer on the circumferential wall to which fuel particles adhere and are scrubbed by the contacting gases, causing the burning streams of gases to be deflected at the opposite end of the combustion chamber inwardly towards the axis of the chamber and the gaseous products of combustion to discharge from said gas outlet at a high velocity, and collecting and withdrawing the ash separated in the combustion chamber in a molten condition from the lower part of the chamber adjacent the gas outlet.

7. The process of burning an ash-containing granular fuel at high rates of heat release which comprises continuously creating a stream of primary air and fuel in suspension whirling at a high angular velocity about a substantially horizontal axis and introducing the whirling primary air-fuel stream through one end of a substantially cylindrical combustion chamber arranged with its axis substantially horizontal and having a normal mean temperature therein above the fuel ash fusion temperature, continuously introducing a high velocity stream of combustion air tangentially to the circumferential wall of the combustion chamber between the point of initial fuel contact therewith and the chamber gas outlet and in an annulus of greater diameter than the entering primary air-fuel stream, causing the burning fuel and air so introduced to move axially of the combustion chamber through a helical path along the circumferential wall of sufficient length to cause combustion of the fuel and the release of substantially all of the recoverable ash in the fuel in a molten condition and the formation of a slag layer on the circumferential wall to which fuel particles adhere and are scrubbed by the contacting gases, causing the furnace gases to be deflected at the opposite end of the combustion chamber inwardly and reversely towards the axis of the chamber and discharge from said opposite end of the chamber at a high velocity, and collecting and withdrawing the ash separated in the combustion chamber in a molten condition from the lower part of the chamber adjacent the gas outlet.

8. The process of burning bituminous and semi-bituminous coals at high rates of heat release which comprises continuously creating a stream of primary air and fuel in suspension whirling at a high angular velocity about a substantially horizontal axis in a cylindrical fuel inlet chamber, introducing a whirling stream of air axially of the fuel inlet chamber, discharging the whirling air-fuel stream through one end of a substantially cylindrical combustion chamber arranged with its axis substantially horizontal and having a normal mean temperature therein above the fuel ash fusion temperature, continuously introducing a single high velocity stream of combustion air tangentially to the circumferential wall of the combustion chamber between the point of initial fuel contact therewith and the chamber gas outlet and angularly displaced approximately 120° from the point of entry of the primary air-fuel stream to the fuel inlet chamber, causing the fuel and air so introduced to move axially of the combustion chamber through a helical path along the circumferential wall of sufficient length to effect complete combustion of the fuel and the release of substantially all of the recoverable ash in the fuel in a molten condition therein and the formation of a slag layer on the circumferential wall to which fuel particles adhere and are scrubbed by the contacting gases, causing the furnace gases to be deflected at the opposite end of the combustion chamber inwardly and reversely towards the axis of the chamber and discharge from said opposite end of the chamber at a high velocity, and collecting and withdrawing the ash separated in the combustion chamber in a molten condition from the lower part of the chamber adjacent the gas outlet.

9. The process of burning an ash-containing solid fuel at high rates of heat release in a combustion chamber of substantially circular cross-section having a gas outlet at one end and a fuel inlet at its opposite end which comprises introducing a stream of air and fuel in suspension at a high angular velocity through said fuel inlet so as to move at a high velocity along the circumferential wall of the chamber while maintaining a normal mean temperature in the chamber above the fuel ash fusion temperature, introducing substantially all of the remaining air required for combustion in a single high velocity stream entering the combustion chamber at a point tangentially arranged relative to an involute curved portion of the circumferential wall thereof and intermediate the point of fuel introduction and the gas outlet, causing the fuel and air as introduced to advance axially of the combustion chamber through a helical path along the circumferential wall of the combustion chamber of sufficient length to cause combustion of the fuel and the deposition of released slag on the circumferential wall to form a sticky surface thereon to which fuel particles adhere and are scrubbed by the contacting gases, causing the combustion gases to be discharged from the gas discharge end of the combustion chamber at a high velocity, and collecting and withdrawing the ash separated in the combustion chamber in a molten condition.

10. The process of burning an ash-containing granular fuel at high rates of heat release in a substantially cylindrical combustion chamber having a circular fuel inlet opening through one end and a gas outlet in its opposite end which comprises introducing a stream of air and fuel in suspension at a high angular velocity through said fuel inlet opening into said combustion chamber so as to move at a high velocity along the circumferential wall thereof while maintaining a normal mean temperature in the chamber above the fuel ash fusion temperature, introducing substantially all of the remaining air required for combustion in a single axially elongated high velocity stream entering tangentially to the circumferential wall of the combustion chamber and intermediate the fuel inlet and the gas outlet, causing the fuel and air streams so introduced to merge and advance axially of the combustion chamber towards said gas outlet through a helical path along the circumferential wall of the combustion chamber of sufficient length to cause substantially complete combustion of the fuel and the release of over 80% of the recoverable ash in the fuel therein, in a molten condition to form a sticky surface on the circumferential wall to which fuel particles will adhere and be burned, and collecting and withdrawing the separated ash in a molten condition from the lower part of the chamber.

11. A cyclone furnace having a combustion chamber of substantially circular cross-section defined by walls having an inner exposed refractory surface, fluid cooling means for said walls, means for introducing a stream of fuel tangentially into said combustion chamber at a high velocity and effecting a helical path of travel therein along the circumferential wall of said chamber, a fluid cooled wall at the opposite end of said chamber including an inwardly projecting throat forming a gas outlet surrounded by an annular pocket, and means for introducing the major portion of the combustion air required in a single stream tangentially to said circumferential wall at a location in said chamber between the point of fuel entry and the chamber gas outlet.

12. A cyclone furnace having a combustion chamber of substantially circular cross-section defined by walls having an inner exposed refractory surface, fluid cooling means for said walls, means for introducing a stream of primary air and ash-containing fuel in suspension into one end of said combustion chamber and effecting a helical path of travel therein at a high angular velocity along the circumferential wall of said chamber, a fluid cooled wall at the opposite end of said chamber including an inwardly projecting throat forming a gas outlet surrounded by an annular pocket, means for introducing substantially the remainder of the combustion air required through an axially elongated air inlet arranged tangentially to an involute curved portion of said circumferential wall at a location in said chamber between the point of fuel entry and the chamber gas outlet, and a slag outlet in the lower part of said chamber.

13. A cyclone furnace having a substantially cylindrical combustion chamber defined by walls having an inner exposed refractory surface, fluid cooling means for said walls proportioned for the maintenance of said refractory under a normal mean temperature in said combustion chamber above the fuel ash fusion temperature, means for introducing a stream of primary air and ash-containing fuel in suspension into one end of said combustion chamber and effecting a helical path of travel therein at a high angular velocity along the circumferential wall of said chamber, a fluid cooled wall at the opposite end of said chamber including an inwardly projecting tapered throat forming a gas outlet flaring towards its discharge end and surrounded by an annular pocket, an axially elongated secondary air inlet arranged tangentially to said circumferential wall at a location in said chamber between the point of fuel entry and the chamber gas outlet, damper means in said secondary air inlet arranged to vary the effective flow area thereof, and a slag outlet in the lower part of said chamber adjacent the gas outlet.

14. A cyclone furnace having a substantially cylindrical combustion chamber arranged with its axis substantially horizontal and defined by walls having an inner exposed refractory surface, a circular fuel inlet chamber of smaller diameter than and opening into one end of said combustion chamber, means for introducing a stream of fuel tangentially into said fuel inlet chamber and effecting a helical path of travel thereof along and in contact with the circumferential wall of said combustion chamber, an air inlet opening axially of said fuel inlet chamber, a gas outlet at the opposite end of said combustion chamber, and means for introducing a high velocity stream of air tangentially to said circumferential wall at a location in said combustion chamber between the point of fuel entry and the combustion chamber gas outlet.

15. A cyclone furnace having a substantially cylindrical combustion chamber arranged with its axis substantially horizontal and defined by walls having an inner exposed refractory surface, fluid cooling means for said walls proportioned to maintain said refractory surface under a normal mean temperature in said combustion chamber above the fuel ash fusion temperature, a circular fuel inlet chamber of smaller diameter than and opening into one end of said combustion chamber, means for introducing a stream of air and an ash-containing fuel in suspension tangentially into said fuel inlet chamber at a high angular velocity and in a helical path of travel therein and along the circumferential wall of said combustion chamber, a gas outlet at the opposite end of said combustion chamber, means for introducing a high velocity stream of air tangentially to said circumferential wall at a location in said combustion chamber between the point of fuel entry and the combustion chamber gas outlet, and a slag outlet in the lower part of said combustion chamber adjacent the gas outlet.

16. In combination, a wall for a furnace chamber in which a positive pressure is normally maintained, said wall having an opening therein to an outer lower pressure zone, closure means for the outer end of said opening, and separate gaseous means creating an inward suction at the outer end of said opening.

17. In combination, a wall defining a furnace chamber in which a positive pressure is normally maintained, said wall having an opening therein to an outer lower pressure zone, closure means for the outer end of said opening, and means for maintaining a high velocity stream of gas through one side of said opening and into said chamber creating an inward suction at the outer end of said opening.

18. In combination, a wall defining a furnace chamber in which a positive pressure is normally maintained, said wall having an inspection opening therein of substantially circular cross-section to an outer lower pressure zone, closure means for the outer end of said opening, and means for maintaining a high velocity whirling stream of air through one side of said inspection opening and into said chamber and creating an inward suction at the outer end of said opening.

19. A cyclone furnace having a substantially cylindrical combustion chamber arranged with its axis substantially horizontal and defined by walls having an inner exposed refractory surface, fluid cooling means for said walls, a circular fuel inlet chamber of smaller diameter than and concentrically opening to one end of said combustion chamber, means for introducing a stream of primary air and an ash-forming fuel in suspension tangentially into said fuel inlet chamber at a high angular velocity and in a helical path of travel therein and along the circumferential wall of said combustion chamber, a gas outlet at the opposite end of said combustion chamber, an axially elongated secondary air inlet arranged tangentially to the outer end of an involute curved portion of said circumferential wall at a location in said combustion chamber between the point of fuel entry and the combustion chamber gas outlet, damper means in said secondary air inlet arranged to vary the effective flow area thereof, and a slag outlet in the lower part of said combustion chamber adjacent the gas outlet.

20. A cyclone furnace having a substanttially cylindrical combustion chamber arranged with its axis substantially horizontal and defined by walls having an inner exposed refractory surface, fluid cooling means for said walls, a circular fuel inlet chamber of smaller diameter than and concentrically opening into one end of said combustion chamber, means for introducing a stream of primary air and an ash-forming fuel in suspension tangentially into said fuel inlet chamber at a high angular velocity and in a helical path of travel therein and along the circumferential wall of said combustion chamber, a fluid cooled wall at the opposite end of said combustion chamber including an inwardly projecting throat forming a gas outlet flaring towards its discharge end and surrounded by an annular pocket, an axially elongated secondary air inlet arranged tangentially to said circumferential wall at a location in said combustion chamber between the point of fuel entry and the combustion chamber gas outlet and spaced angularly from the point of fuel entry into said fuel inlet chamber, and means forming a fluid cooled slag outlet in the lower part of said combustion chamber out of the flow path to said gas outlet.

21. A steam generating unit having a fluid circulating system and comprising walls defining a substantially cylindrical combustion chamber arranged with its axis substantially horizontal, fluid cooling means for said walls, means for introducing a whirling stream of air and ash-forming fuel in suspension into one end of said combustion chamber and effecting a helical path of travel thereof along the circumferential wall of said chamber, a gas outlet at the opposite end of said chamber, means for introducing a high velocity stream of air tangentially to said circumferential wall at a location in said chamber between the point of fuel entry and the chamber gas outlet, a slag outlet in the lower part of said chamber, a secondary furnace chamber laterally adjacent and opening to said combustion chamber gas outlet, a vertically disposed fluid cooled screen in the secondary furnace chamber in the gas flow path from said gas outlet, and means connecting said wall and screen fluid cooling means into the circulating system of said generating unit.

22. A steam generating unit comprising walls defining a combustion chamber of substantially circular cross-section arranged with its axis substantially horizontal, means for introducing a stream of air and ash-forming fuel in suspension into one end of said combustion chamber and effecting a helical path of travel along the circumferential wall of said chamber, a gas outlet at the opposite end of said chamber, means for introducing a high velocity stream of air tangentially to said circumferential wall at a location in said chamber between the point of fuel entry and the chamber gas outlet, a slag outlet at said opposite end of the combustion chamber, a secondary furnace chamber laterally adjacent and opening to said combustion chamber outlet, a reflecting arch in the secondary furnace chamber in the gas flow path from and adjacent to said gas outlet, and a slag outlet from said secondary furnace chamber below the level of said combustion chamber gas outlet.

23. A steam generating unit having a fluid circulating system and comprising walls defining a combustion chamber of substantially circular cross-section arranged with its axis substantially horizontal, fluid cooling means for said walls, means for introducing a stream of air and ash-forming fuel in suspension into one end of said combustion chamber and effecting a helical path of travel thereof along the circumferential wall of said chamber, a fluid cooled wall at the opposite end of said chamber including an inwardly projecting throat forming a gas outlet surrounded by an annular pocket, means for introducing a high velocity stream of air tangentially to said circumferential wall at a location in said chamber between the point of fuel entry and the chamber gas outlet, a slag outlet in said opposite end wall below said gas outlet, a secondary furnace chamber laterally adjacent and opening to said combustion chamber gas outlet, means forming a fluid cooled reflecting arch and a slag screen in the secondary furnace chamber in the gas flow path from and adjacent to said gas outlet, means connecting said wall and screen fluid cooling means into the circulating system of said generating unit, and a slag outlet from said secondary furnace chamber below the level of said combustion chamber gas outlet.

24. A cyclone furnace having walls defining a substantially cylindrical combustion chamber, a fuel inlet opening into one end of said combustion chamber, a gas outlet at the opposite end of said combustion chamber, and an axially elongated air inlet arranged tangentially of the circumferential wall of said combustion chamber between the point of fuel entry and said gas outlet, said parts being relatively proportioned to have approximately the following values relative to the diameter of said combustion chamber: $L=16D$ and $E=7.6D$, where D is the combustion chamber diameter in feet, L is the length of the combustion chamber in inches, and E is the length of the air inlet in inches.

25. A cyclone furnace having walls defining a substantially cylindrical combustion chamber, a fuel inlet opening into one end of said combustion chamber, an inwardly projecting tapered throat forming a gas outlet concentrically arranged at the opposite end of said combustion chamber, and an axially elongated air inlet arranged tangentially of the circumferential wall of said combustion chamber between the point of fuel entry and said gas outlet, said parts being relatively proportioned to have approximately the following values relative to the diameter of said combustion chamber: $L=16D$, $E=7.6D$, $F=.6D$, $G=5D$, and $H=3D$, where D is the combustion chamber diameter in feet, L is the length of the combustion chamber in inches, E is the length of the air inlet in inches, F is the width of the air inlet in inches, G is the minimum gas outlet diameter in inches and H is the length of the outlet throat in inches.

26. A cyclone furnace having walls defining a substantially cylindrical combustion chamber, a circular fuel inlet chamber of smaller diameter than and opening into one end of said combustion chamber, a fuel inlet arranged tangentially of said fuel inlet chamber, a circular gas outlet at the opposite end of said combustion chamber, and an air inlet arranged tangentially of the circumferential wall of said combustion chamber between the point of fuel entry and said gas outlet, said parts being relatively proportioned to have approximately the following values relative to the diameter of said combustion chamber: $L=16D$, $C=5.4D$, and $G=5D$, where D is the combustion chamber diameter in feet, L is the length of the combustion chamber in inches, C is the diameter of the fuel inlet chamber in inches, and G is the minimum gas outlet diameter in inches.

27. The process of burning an ash-containing granular fuel in a horizontally arranged combustion chamber of substantially circular cross-section having a fuel inlet opening in one end and a gas outlet in its opposite end, which comprises introducing a stream of air and fuel in suspension whirling about a horizontal axis through said fuel inlet opening into the combustion chamber so as to move at a high velocity along the circumferential wall thereof while burning the fuel to maintain a normal mean temperature in the chamber above the fuel ash fusion temperature, continuously introducing secondary combustion air in a stream entering at a high velocity tangentially to the circumferential wall of the combustion chamber intermediate the fuel inlet and gas outlet thereof, causing the fuel and air streams so introduced to merge and advance axially of the combustion chamber towards the gas outlet through a helical path along the circumferential wall of sufficient length to cause substantially complete combustion of the fuel and the release of fuel ash therein in a condition to form a sticky surface on the circumferential wall to which fuel particles will adhere and be burned, and withdrawing separated ash in a molten condition from the lower part of the combustion chamber.

28. The process of burning an ash-containing granular fuel in a combustion chamber of substantially circular cross-section having a fuel inlet opening at one end and a gas outlet at its opposite end, which comprises introducing a whirling stream of air and fuel in suspension through said fuel inlet opening into the combustion chamber so as to move at a high velocity along the circumferential wall thereof while burning the fuel to maintain a normal mean temperature in the chamber above the fuel ash fusion temperature, introducing secondary combustion air in a stream entering at a high velocity tangentially to the circumferential wall of the combustion chamber intermediate the fuel inlet and gas outlet thereof and in the same angular direction as the whirling stream of fuel and air, causing the fuel and air streams so introduced to merge and advance axially of the combustion chamber towards the gas outlet through a helical path along the circumferential wall of sufficient length to cause substantially complete combustion of the fuel and the release of fuel ash therein in a condition to form a sticky surface on the circumferential wall to which fuel particles will adhere and be burned, and withdrawing separated ash in a molten condition from the lower part of the combustion chamber.

ERVIN G. BAILEY.
HOWARD J. KERR.
JAMES FLETCHER.
GEORGE A. WATTS.
LAMBERT KOOISTRA.

CERTIFICATE OF CORRECTION.

Patent No. 2,357,301.  September 5, 1944.

ERVIN G. BAILEY, ET AL.

It is hereby certified that error appears in the printed specification of the above numbered patent requiring correction as follows: Page 4, first column, line 4, for "ouening" read --opening--; and second column, line 11, for "126°" read --120°--; line 49-50, for "befor" read --before--; and that the said Letters Patent should be read with this correction therein that the same may conform to the record of the case in the Patent Office.

Signed and sealed this 30th day of January, A. D. 1945.

Leslie Frazer (Seal)  Acting Commissioner of Patents.